W. H. McWHIRTER.
CLEVIS.
APPLICATION FILED MAR. 23, 1910.

999,830.

Patented Aug. 8, 1911.

Witnesses

Inventors
W. H. McWhirter
By John S. Duffie
Attorneys

UNITED STATES PATENT OFFICE.

WILLIAM HENRY McWHIRTER, OF PONTOTOC, MISSISSIPPI.

CLEVIS.

999,830.  Specification of Letters Patent.  Patented Aug. 8, 1911.

Application filed March 23, 1910. Serial No. 551,207.

*To all whom it may concern:*

Be it known that I, WILLIAM H. MC-WHIRTER, a citizen of the United States, residing at Pontotoc, in the county of Pontotoc and State of Mississippi, have invented certain new and useful Improvements in Clevises, of which the following is a specification.

My invention is a clevis, sometimes called a bulk-head, but however, the proper name is clevis. It is a piece of metal substantially in the shape of an ox-bow, its two ends perforated vertically in relation to their faces, the forward part of the clevis for the purpose of description we will call the head. In my clevis the front part of the head is provided with hooks and the rear part of said head is provided with a rearwardly extending pin.

Figure 1:
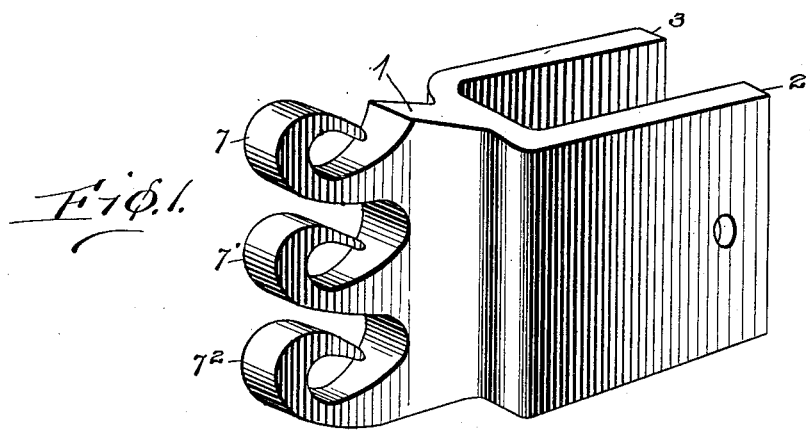
Figure 2:
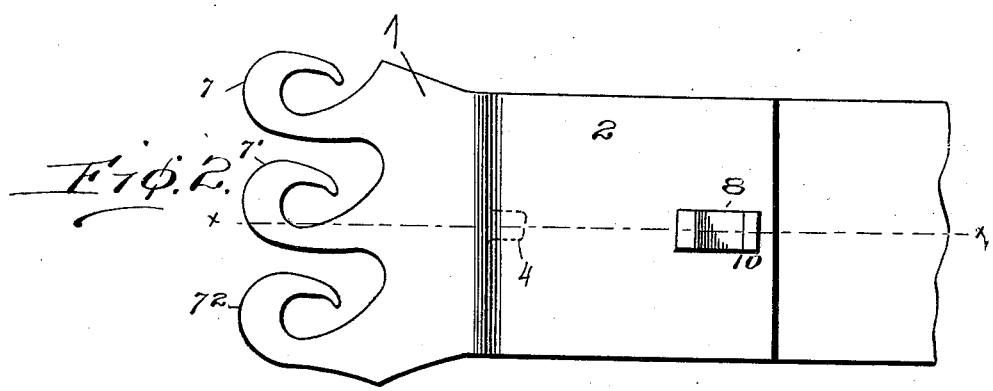
Figure 3:
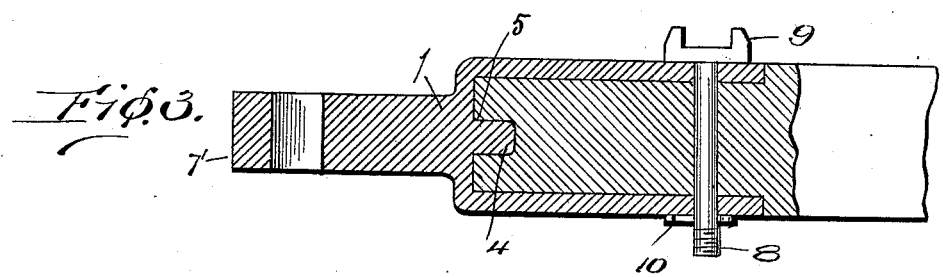

In the accompanying drawings: Figure 1, is a perspective view of my clevis. Fig. 2, is a top plan view of my clevis secured to a plow beam. Fig. 3, is a vertical sectional view of my clevis cut on the line *x x* of Fig. 2, in which view is also shown a view of my wrench bolt and cotter pin in perspective.

Referring more particularly to the drawings my invention is described as follows; the numeral 1, represents the head of the clevis, 2, represents the upper arm, 3, the lower arm, and extending rearwardly from the rear face of the head 1, is a pin 4. This pin enters a horizontal hole 5, in the front end of the draft beam 6, in the plow, on the tongue of a wagon or other vehicle. The purpose of this pin entering into said hole, is to prevent the clevis from swinging to the right or left, thereby preventing inconvenience from its dangling when the team is turning, catching trash and the like. Extending horizontally from the front edge of said head 1, is a series of hooks 7, 7', 7², these hooks are turned partly down at their points into openings formed by the curve of said hooks, so that the lap-ring or other fastening of a swingletree or a whiffletree will not drop out of the same. There may be more than three hooks, there may be as many as 5, 6, or more.

It will be seen that the pin 4, and hooks 7, are integral with the head 1, and that the arms 2, and 3, are also integral with said head and therefore, by using cores to make an opening in the rear ends of said arms, the clevis may be cast or molded at one running, and it will therefore be seen that it may be made very cheaply.

It often happens, in cultivating young crops, that we want the plow to incline a little to the right or left, in which case the draft animal should walk a little to one side of the row and thereby not tramp down the growing crop, in which case the animal should be hooked to one of the side hooks.

The clevis is secured to the plow by a wrench bolt 8, having a wrench head 9, and secured in place by a cotter pin 10. Though any other substantial means may be employed to secure said clevis in place.

Having described my invention what I claim as new and desire to secure by Letters Patent, is:

In a plow, the combination of a draft beam, provided with a horizontal hole in its front end and a vertical perforation near its front end, of a clevis formed with a head and rearwardly extending plates, said plates being wide enough to cover and protect the upper and lower faces of said beam at its front end, and a pin extending rearwardly from the head of said clevis, and adapted to enter said horizontal hole, and a series of hooks horizontally arranged in relation to the faces of said plates and secured to the front end of said clevis and extending forwardly, said plates provided with perforations near their ends to register with said vertical perforation in the beam and securing means in the perforations in said plates and beam, substantially as shown and described.

In testimony whereof I affix my signature, in presence of two witnesses.

WILLIAM HENRY McWHIRTER.

Witnesses:
T. S. NEELY,
F. E. JOHNSON, Jr.

---

Copies of this patent may be obtained for five cents each, by addressing the "Commissioner of Patents, Washington, D. C."